(12) United States Patent
Brower (10) Patent No.: US 8,996,192 B2
(45) Date of Patent: Mar. 31, 2015

(54) THERMAL MANAGEMENT FOR INTEGRATED CIRCUITS

(75) Inventor: Jeffrey H. Brower, Dallas, TX (US)

(73) Assignee: Signalogic, Inc., Dallas, TX (US)

( * ) Notice: Subject to any disclaimer, the term of this patent is extended or adjusted under 35 U.S.C. 154(b) by 522 days.

(21) Appl. No.: 13/397,534

(22) Filed: Feb. 15, 2012

(65) Prior Publication Data

US 2012/0209448 A1 Aug. 16, 2012

Related U.S. Application Data

(60) Provisional application No. 61/443,394, filed on Feb. 16, 2011, provisional application No. 61/443,430, filed on Feb. 16, 2011.

(51) Int. Cl.
| | |
|---|---|
| *G05D 23/00* | (2006.01) |
| *G06F 1/20* | (2006.01) |
| *G06F 1/00* | (2006.01) |
| *G06F 11/30* | (2006.01) |

(52) U.S. Cl.
CPC ..................... *G06F 1/206* (2013.01)
USPC ............................ 700/299; 713/300; 713/340

(58) Field of Classification Search
CPC ........................................ G06F 1/206
USPC .................................. 700/299; 713/300–340
See application file for complete search history.

(56) References Cited

U.S. PATENT DOCUMENTS

| | | | | |
|---|---|---|---|---|
| 7,638,874 | B2 * | 12/2009 | Chiu et al. ................... | 257/713 |
| 8,786,449 | B1 * | 7/2014 | Kraipak et al. .............. | 340/584 |
| 2007/0011288 | A1 * | 1/2007 | Cases et al. .................. | 709/223 |
| 2007/0098137 | A1 * | 5/2007 | Joshi et al. ...................... | 378/19 |
| 2008/0123238 | A1 * | 5/2008 | Campos et al. .............. | 361/103 |
| 2008/0215283 | A1 * | 9/2008 | Sri-Jayantha et al. ........ | 702/130 |
| 2009/0164852 | A1 * | 6/2009 | Purrington et al. ............ | 714/48 |
| 2009/0312887 | A1 * | 12/2009 | Barry et al. .................. | 700/300 |
| 2010/0169585 | A1 * | 7/2010 | Steinbrecher et al. ........ | 711/154 |
| 2010/0281884 | A1 * | 11/2010 | Rawski et al. ................... | 62/3.6 |
| 2011/0096809 | A1 * | 4/2011 | Campos et al. .............. | 374/178 |
| 2012/0124590 | A1 * | 5/2012 | Balakrishnan et al. ....... | 718/103 |

* cited by examiner

*Primary Examiner* — Ramesh Patel
(74) *Attorney, Agent, or Firm* — Haynes and Boone, LLP (57) ABSTRACT

A method and system for thermal management in integrated circuits and integrated circuit boards is described. In an embodiment, the circuit device board includes circuit devices, temperature sensors, and a thermal management unit. The thermal management unit receives thermal data from the temperature sensors and determines thermal reference points that define thermal regions. The thermal reference points are correlated with the operating characteristics of the circuit devices. When warranted, the thermal management unit makes independent corrective responses to each of the thermal regions. These corrective responses include modifying operating parameters, adjusting workload, and suspending operation of circuit devices within the thermal region. Thus, the disclosed method and system can preserve function in one thermal region while alleviating stress on another thermal region.

21 Claims, 10 Drawing Sheets

THERMAL MANAGEMENT FOR INTEGRATED CIRCUITS

The present application claims benefit of U.S. provisional patent applications 61/443,394, filed Feb. 16, 2011, entitled "PCB Embedded Heat Dissipation Method," and 61/443,430, filed Feb. 16, 2011, entitled "PCB Dynamic Heat Method." The entirety of these disclosures is hereby incorporated by reference.

BACKGROUND

Rapid advances in semiconductor technology have dramatically changed the landscape of integrated circuits (IC) and their applications. Feature sizes continue to fall despite the increasing time and effort required to deliver improvements. Developments in device density allow a greater number of circuit devices to be fit into a given area. At the same time, device performance continues to improve, thereby delivering greater speeds, increased efficiency, and reduced cost. These improvements both necessitate and facilitate advances in fields such as device design, manufacturing technology, system integration, and software engineering.

For example, increasing circuit density frequently increases the amount of heat generated within a region. While efficiency gains may cut down on heat produced by a given device, frequently this thermal efficiency is more than offset by the increased number of circuits and increased leakage. As a result, advanced devices generate more heat in a smaller area. This heat must be controlled as it can lead to system instability, thermal shutdown, and even permanent damage. To meet customers' performance and efficiency goals and to allow future improvements in device density, increasingly complex methods of thermal management are required.

BRIEF DESCRIPTION OF THE DRAWINGS

The features and advantages of the present disclosure will be apparent from the following detailed description and the accompanying figures. It is understood that the figures that follow are merely illustrative and, in the interest of clarity, are not necessarily drawn to scale. Furthermore, features may be enlarged or omitted as necessary to best illustrate the invention.

DETAILED DESCRIPTION

The present disclosure relates generally to integrated circuit design, integration, and operation and more particularly to devices and methods for thermal management of integrated circuit devices.

The following disclosure describes features of multiple separate embodiments. The specific embodiments are selected to promote clarity and understanding. As examples, it is understood that the embodiments that follow are not intended to be limiting. Except as noted, features may be combined between embodiments. Other features may be omitted from some embodiments. Unless otherwise specified, the repetition of numbers between figures does not convey any relationship between the embodiments depicted therein.

Moreover, a description of a first device connected to a second device may include embodiments in which the first device is directly connected to the second device and may further include embodiments where the first device and the second are connected via an intermediary. Similarly, references made to directions and locations, such as "above," "below," "to the left," and "to the right," are intended to simplify understanding of an illustrated embodiment. The disclosure applies equally to embodiments where the orientation is altered. For example, a device described as being above another may be located below when an actual embodiment is observed. This is understood, as any embodiment may be observed from any orientation.

Figure 1:
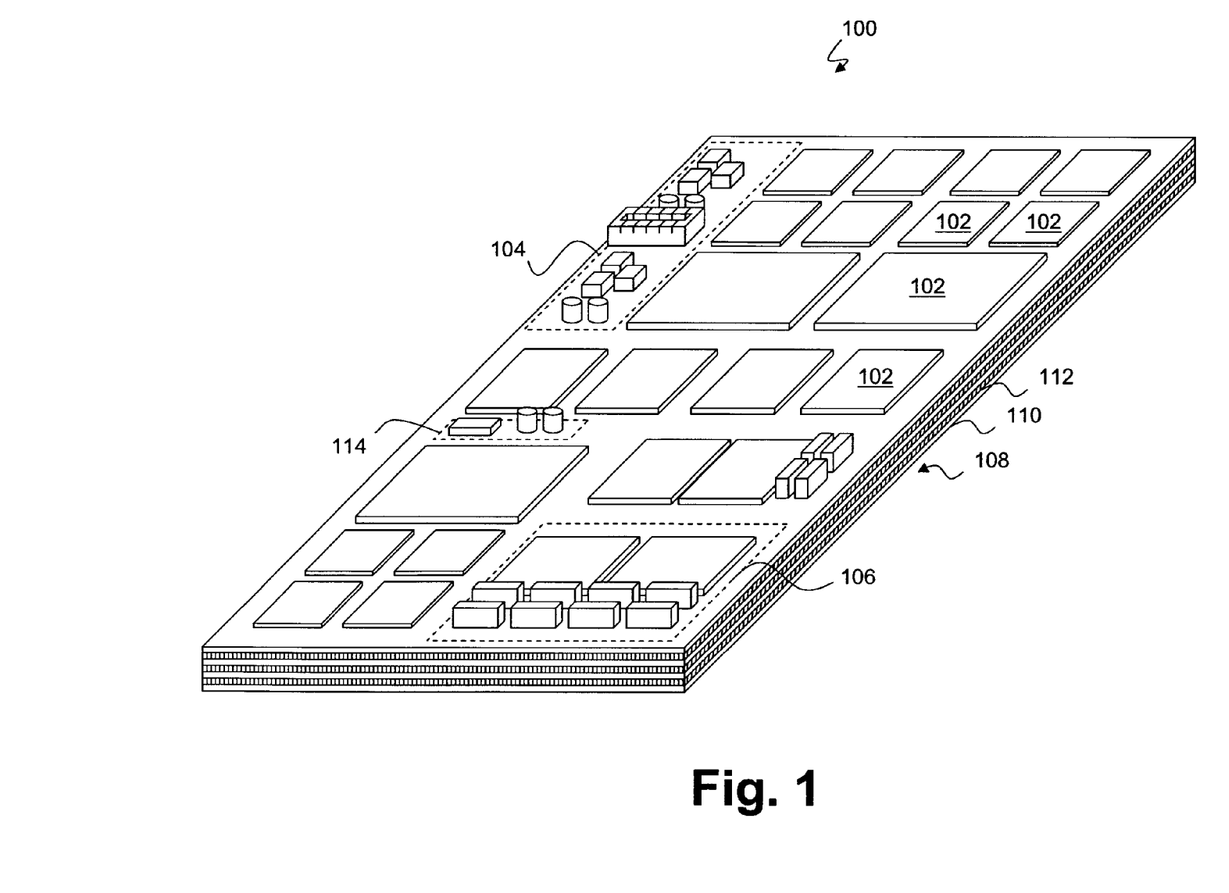
FIG. 1 is a diagrammatic perspective view of a device board according to various aspects of the present disclosure.

FIG. 1 is a diagrammatic perspective view of a device board 100. The device board 100 may be an essential component of a host system, such as a motherboard or daughtercard, and may also be an expansion card to expand the capabilities of the host system. Device boards 100 are commonly used to add additional processing power, to add networking capability, to add signal processing capacity, to add graphics and audio functionality, to add input and output bandwidth, to handle device I/O, and to add any other suitable enhancement to the host system. The device board 100 includes a number of components including circuit devices 102 for providing functionality, a bus interface unit 104 for interfacing with other devices, and a power-regulating unit 106 for performing voltage control. The components are disposed on a printed circuit board (PCB) 108.

The circuit devices 102 provide the bulk of the functionality of the device board 100. In some embodiments, the circuit devices 102 include integrated circuit processing devices such as general-purpose processors (CPUs), graphics processing units (GPUs), multicore processors, digital signal processors (DSPs), and/or other suitable processors. In some embodiments, the circuit devices 102 include field-programmable gate arrays (FPGAs), programmable logic controllers (PLCs), and/or microcontrollers. Commonly, the circuit devices 102 include other integrated circuits such as interface devices (e.g., a bridge device), fabric controllers, analog-to-digital converters, watchdog monitors, and memory circuits (e.g., RAM, ROM, EEPROM, and/or Flash Memory). Circuit devices 102 may also include supporting devices such as capacitors, resistors, diodes, optical isolators, and other suitable supporting devices.

The bus interface unit 104 transports data between the device board 100 and other device boards, peripheral components, a host system, and any other suitable system or device. The bus interface unit 104 provides any number of data connections and may further provide connections for supply voltage, clock signals, diagnostic and status signals, and other suitable signals. These data connections may take the form of a connector such as a blade connector, a pin array connector, a socket connector, a cable connector, or any other connector known to one of skill in the art. In an exemplary embodiment, these data connections are established wirelessly. The bus interface unit 104 may support any data transfer standard including Ethernet, IEEE 802.11. PCIe (Peripheral Component Interconnect Express), PCI, RapidIO, AGP (Accelerated Graphics Port), ISA, SATA, InfiniBand, USB, and other suitable bus standards.

The power-regulating unit 106 receives a supply voltage, commonly a DC voltage from a computing system power supply or battery, and distributes an operational voltage to other components of the device board 100 such as the bus interface unit 104 and the circuit devices 102. The operational voltage may be stepped down or stepped up from the supply voltage and may be a rectified DC function of the supply voltage, such as in embodiments with an AC supply voltage. In some embodiments, the power-regulating unit 106 receives the supply voltage via the bus interface unit 104. In further embodiments, the power-regulating unit 106 includes power connectors for receiving the supply voltage directly. The power-regulating unit 106 commonly includes power-handling components such as transformers, diodes, capacitors, inductors, power MOSFETs, and fusible links.

In some embodiments, the power-regulating unit 106 is an adaptive power-regulating unit. The adaptive power-regulating unit is capable of varying the operational voltage delivered to the circuit devices 102 based on a voltage control signal. For example, the adaptive power-regulating unit may be configured to supply a 3.5V DC operational voltage nominally and may be able to vary the operational voltage +/−10% in response to the voltage control signal. In further embodiments, the adaptive power-regulating unit is capable of delivering a first operational voltage to a first circuit device while delivering a second operational voltage to a second circuit device. This allows the adaptive power-regulating unit to increase or reduce power to a particular circuit device without affecting other circuit devices. An adaptive power-regulating unit is particularly useful for managing heat. For example, if the first circuit device approaches a critical temperature, power to the device can be reduced. Reducing the operational voltage of the first circuit device may decrease heat output but may also decrease performance. By maintaining a higher operational voltage for the second circuit device, which is not experiencing thermal issues, the overall performance of the device board 100 is not as severely impacted.

In some embodiments, the device board 100 further includes a clock control unit 114. The clock control unit 114 generates and distributes a clock signal to the circuit devices 102. The clock signal is commonly based on a reference clock. In some embodiments, the reference clock is received via the bus interface unit 104. In further embodiments, the reference clock is generated by an oscillator such as an oscillator crystal, a ceramic resonator, or an oscillating circuit. To create the clock signal, the clock control unit 114 may distribute the reference clock without modification or it may perform synchronization, shaping, amplification, frequency division or multiplication, duty cycle adjustment, or other suitable modifications to the reference clock.

In a further embodiment, the clock control unit 114 is an adaptive clock control unit. The adaptive clock control unit is configured to adjust the clock signal delivered to the circuit devices 102 in response to a frequency control signal. For example, the adaptive clock control unit may generate a 1 GHz clock by default with the ability to adjust the clock frequency by up to +20% or down to −50% based on the frequency control signal. In some embodiments, the adaptive clock control unit is capable of delivering a first clock signal to a first circuit device while delivering a second clock signal to a second circuit device and is capable of adjusting the different clock signals independently. This allows the clock control unit to respond to changing needs of the first circuit device while maintaining an optimal clock for the second circuit device. For example, the clock control unit may reduce the clock frequency for the first circuit device in response to a thermal condition. Reducing the clock frequency commonly reduces power consumption and heat production. It may also reduce overall performance. If the first circuit device is approaching a temperature limit, an adaptive clock control unit can reduce the clock signal frequency of the first circuit device while maintaining the clock signal frequency of the second circuit device. Because the second circuit device can continue operating at a higher frequency, the impact on overall performance is reduced.

The circuit devices 102, the bus interface unit 104, the power-regulating unit 106, and, in some embodiments, the clock control unit 114 are mounted on the printed circuit board (PCB) 108. The PCB 108 physically supports the components and provides connections between them. In many embodiments, the PCB 108 is made up of a number of layers. These include insulating layers 110 and trace layers 112. The insulating layers 110 provide physical rigidity and durability. They typically contain dielectric material combined with an epoxy to create a laminate sheet. For example, the insulating layers 110 may comprise an FR4-rated glass-reinforced epoxy laminate. The trace layers 112 contain conductive traces that connect the components disposed on the PCB 108 including the circuit devices 102, the bus interface unit 104, and the power-regulating unit 106. Based on the application, the conductive traces may be formed from any conductive material including copper, tin, silver, and gold, other metals and alloys and including non-metallic conductors such as graphite, conductive polymers, and organic conductors. The conductive traces may be formed on or bonded to the insulating layers 110 directly or may be formed on a backing material. Connecting traces on different trace layers 112 often requires creating openings in the insulating layers 110. The openings are then filled with a conductor to create via structures between the traces of the different trace layers 112.

Figure 2:
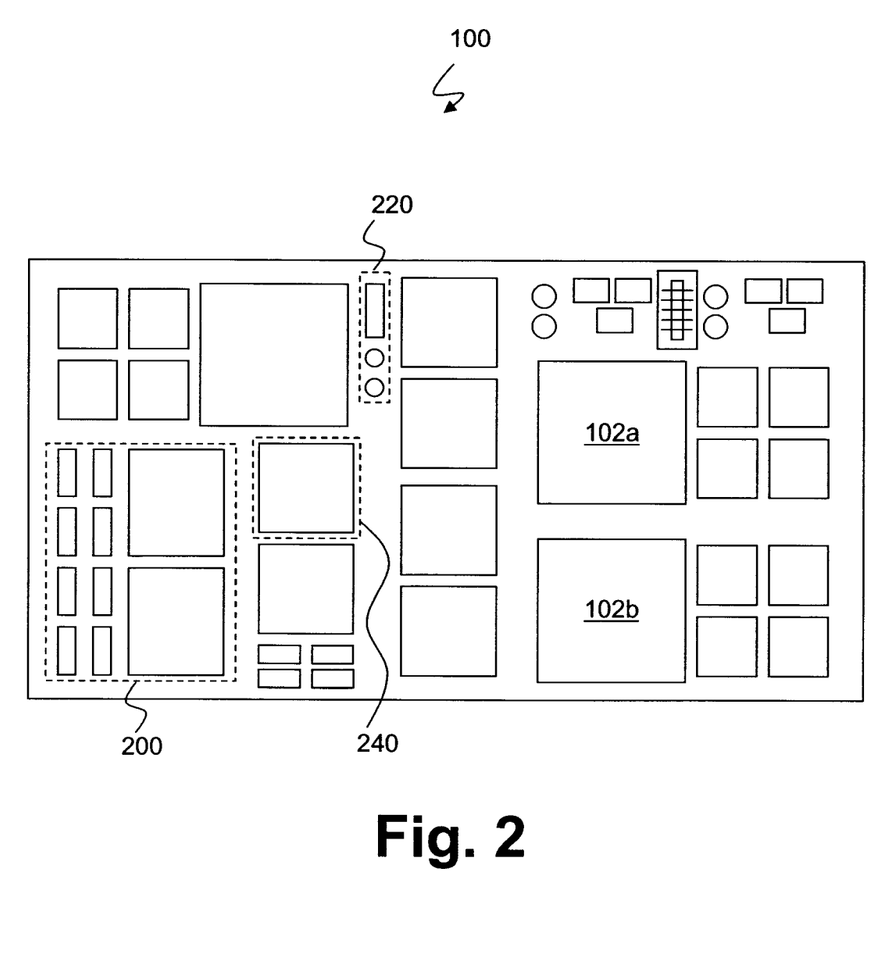
FIG. 2 is a diagrammatic top view of a device board according to various aspects of the present disclosure.

FIG. 2 is a diagrammatic top view of a device board 100. FIG. 2 and all other figures herein are simplified for clarity. In the depicted embodiment, the power-regulating unit is an adaptive power-regulating unit 200. The adaptive power-regulating unit 200 is capable of varying the operational voltages delivered to the circuit devices 102*a* and 102*b* based on independent voltage control signals. In a further embodiment, the clock control unit is an adaptive clock control unit 220. The adaptive clock control unit 220 is capable of delivering a first clock signal to a first circuit device 102*a* while delivering a second clock signal to a second circuit device 102*b* and is capable of adjusting the different clock signals independently. It is understood that the designations of circuit device 102*a* and circuit device 102*b* are arbitrary and do not imply that the operational voltage is in any manner linked to the clock signal for a given circuit device.

In an embodiment, the device board further includes a dispatch unit 240. The dispatch unit 240 receives instructions and distributes the instructions for execution to the circuit devices including circuit devices 102*a* and 102*b*. When determining the distribution of workload, the dispatch unit 240 may look to criteria including capabilities of each circuit device, current workload of each circuit device, data dependencies, available board resources such as bus availability, operating conditions of each circuit device, and other performance-related criteria. The dispatch unit 240 may also look to the thermal conditions and thermal profile of a circuit device 102. A thermal factor may be included when weighing the desirability of a particular circuit device. For example, the dispatch unit 240 may forego sending some instructions to device 102*a* in response to a thermal factor. A more severe thermal factor may cause the dispatch unit to forego sending any instructions to device 102*a*. A critical thermal factor may cause the dispatch unit to cancel instructions sent to circuit device 102*a* and reassign them to device 102*b*. Many circuit devices consume less energy and produce less heat when idle. Thus, it is possible that the temperature of device 102*a* will drop during the idle time and relieve the thermal condition. Furthermore, if device 102*b* is not experiencing an adverse thermal condition and has bandwidth available to execute the instruction, the overall performance penalty may be small.

Figure 3:
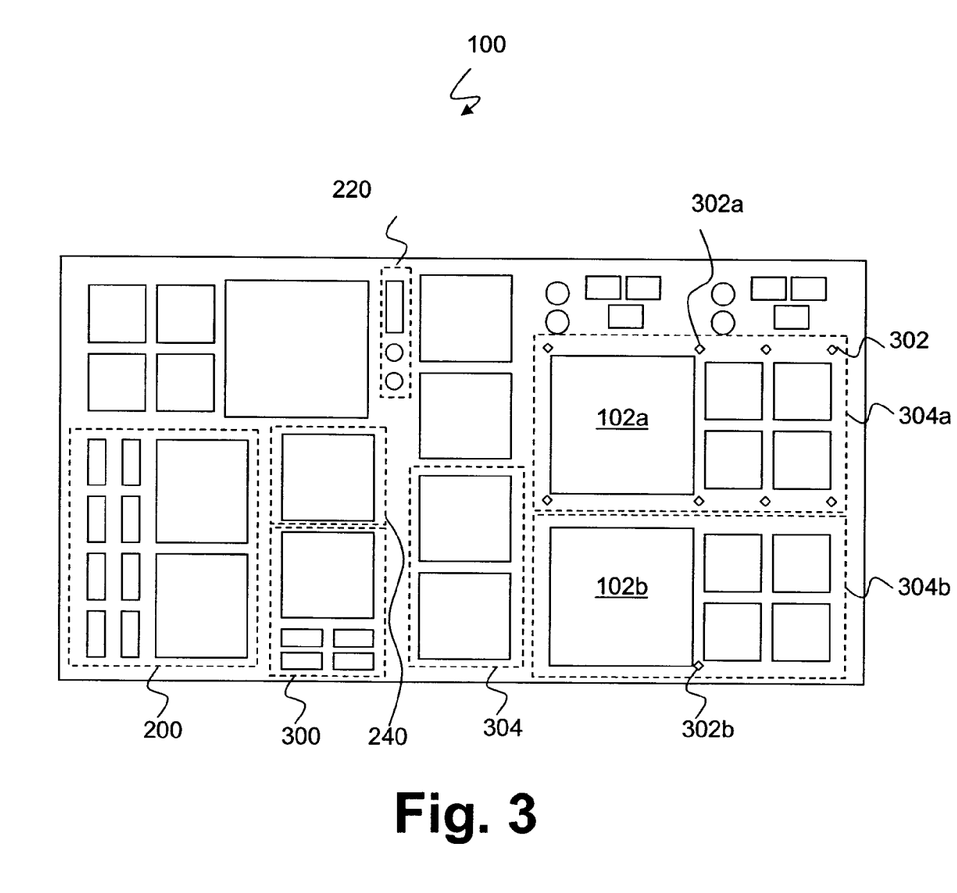
FIG. 3 is a diagrammatic top view of a device board according to various aspects of the present disclosure.

FIG. 3 is a diagrammatic top view of a device board 100 according to an embodiment of the present disclosure. The device board 100 further includes a thermal monitor unit 300. The thermal monitor unit 300 receives temperature data from a number of temperature sensors 302. The temperature sensors 302 produce temperature data, which may include producing an analog or digital temperature reading, producing a warning when a critical temperature is reached or surpassed, producing another type of temperature data, or a combination thereof. Temperature sensors 302 may be stand-alone devices, and, in some embodiments, temperature sensors are integrated into circuit devices 102. Data from the temperature sensors 302 is used to determine conditions at thermal reference points. Thermal reference points are not limited to locations of temperature sensors 302. In many embodiments, conditions at thermal reference points are interpolated from temperature sensor data. Groups of thermal reference points form a thermal region 304 (of which thermal region 304*a* and 304*b* are examples) of the device board 100. Thermal regions 304 are defined as needed and may be defined differently for each operating parameter. Thermal regions 304 may contain part of a circuit device 102, an entire circuit device 102, and/or multiple circuit devices 102. It is not necessary for the entire device board 100 to have a corresponding thermal region 304. Particularly, areas of low density may not have an associated thermal region 304. Taken together, these thermal regions 304, when evaluated in light of the architecture of the device board 100, make up a thermal map. By aggregating temperature data from the various thermal reference points and processing them to create a thermal map of the region, one or more operating characteristics of the circuits on the device board 100 can be modified to respond to and manage the thermal characteristics of the device board 100.

The thermal map represents the current thermal conditions throughout the thermal regions. With reference to the circuit devices 102 and arrangement of circuit devices 102 shown in various embodiments, there is a known or ascertainable spatial relationship between the elements on the PCB 108 and the values represented on the thermal map. In one embodiment, the thermal map is correlated with the physical dimensions of the underlying circuit devices 102, so that a change in value at a thermal reference point corresponds to a change in the conditions at a particular location in two-dimensional (X-Y) or three-dimensional (X-Y-Z) space. This correlation may be developed by using or inputting physical specifications from the layout and characteristics of the underlying circuit devices 102 and elements of the circuit devices 102, or it may be built up probabilistically by observing correlations between various thermal reference points and creating the map that corresponds to the observed or inferred relationships.

To provide increased granularity, it is frequently necessary to interpolate conditions at thermal reference points where temperature sensors 302 are not available. Interpolation may be performed using a purely linear interpolation where temperature is assumed to vary linearly between the temperature sensors 302. For example, temperature at thermal reference point X, $T_X$, between sensors A and B can be estimated as:

$$T_X = T_A + \frac{(T_B - T_A)D_{A \to X}}{D_{A \to B}}$$

However, this type of linear interpolation does not account for thermal factors such as a heat-generating element located between sensors A and B. To correct for this, in some embodiments, the thermal monitor unit 300 calculates the temperature at a thermal reference point X based on the distance from nearby sensors, the existence and location of heat-generating circuit devices between the sensors, and the distance between point X and the heat-generating devices. In some embodiments, the thermal monitor unit 300 further compensates for the operating parameters of the heat-generating devices when determining the effect on the thermal reference point. By considering the physical structure of the thermal zones, the thermal monitor unit 300 constructs a more accurate thermal map. The thermal map may also include thermal factors that are not circuit devices 102 and thermal factors that are not near the thermal region 304. For example, the thermal monitor unit 300 may consider a heat source that is not part of the device board 100 but is known to have an effect on the thermal reference point. Other relevant systemic factors include airflow, nearby cooling solutions, and other thermal aspects of the host system.

It may not always be possible, practical, or desirable to construct a thermal map with knowledge of all possible mechanisms that may drive thermal conditions. Thus in some embodiments, the thermal monitor unit 300 observes the changes in thermal conditions over time at various thermal reference points and adapts the thermal map accordingly. This may include analyzing the correspondence between two or more thermal reference points. As an example, a first and a second temperature sensor 302 track closely when a given circuit device 102*a* is active. The thermal monitor unit may infer that circuit device 102*a* affects both sensors 302 and also affects nearby thermal reference points. As a further example, an unknown host system trait causes adverse thermal conditions at one or more temperature sensors 302 on a regular basis. The thermal monitor unit can then use this information when interpolating thermal conditions at other thermal reference points. This spatially and operationally aware mapping provides more accurate prediction and monitoring of thermal reference points where temperature sensors 302 are not available and facilitates more effective responses.

As explained, the thermal monitor unit 300 may account for thermal factors, such as systemic factors, by using them to calculate thermal conditions at thermal reference points. Furthermore, in some embodiments, the thermal monitor unit 300 considers the systemic conditions including circuit devices 102 when determining a response to a thermal condition. It should be emphasized that it is not always necessary to determine the cause of a thermal condition to be able to formulate an effective response.

One of the most basic responses is a trigger response where the voltage, clock rate, or workload of one or more circuit devices 102 within a thermal region 304 is modified when the point or area corresponding to that circuit device 102 passes some threshold. In an embodiment implementing a trigger response, the thermal monitor unit 300 analyzes the temperature data to determine when a triggering event occurs. A wide variety of triggering events is contemplated. For example, a single report of excessive temperature by a single temperature sensor 302 may be a triggering event. An excessive temperature over a prolonged period may also be a triggering event. A sudden increase in temperature or a rate of increase may trigger a response. A trigger may be based on a number of temperature sensors 302 within a thermal region 304 experiencing excessive temperatures. In some embodiments, a number of temperature sensors 302 reporting high but not critical temperatures triggers a response. Commonly, it will not be possible to dispose a temperature sensor 302 next to a critical device. Therefore, in many embodiments, the thermal monitor unit 300 interpolates conditions at thermal reference points throughout the thermal region 304. Thus, the triggering event may be a temperature that is calculated, not recorded by a temperature sensor 302.

When a response is warranted, the thermal monitor unit 300 may take one or more corrective actions. These responses include changing operating parameters such as voltage, clock frequency, or workload. Referring still to FIG. 3, in one exemplary embodiment, the thermal monitor unit 300 interacts with an adaptive power-regulating unit 200 to control one or more operating voltages for the circuit devices 102. If the thermal conditions at a thermal reference point indicates a response is needed for thermal region 304a. the thermal monitor unit 300 sends a voltage control signal to the adaptive power-regulating unit 200 to lower the operating voltage of one or more of the circuits within, adjacent to, or thermally coupled to the thermal region 304a. such as circuit device 102a . At the same time, if thermal conditions indicate that the thermal region 304b is within the acceptable temperature range, the thermal monitor unit 300 can send a voltage control signal to the adaptive power-regulating unit 200 to maintain or increase the current operating voltage for one or more circuits within, adjacent to, or thermally coupled with thermal region 304b . Thus, circuit devices in thermal region 304b. which are not experiencing heat issues, are able to operate at a higher voltage and level of performance. In this way, the thermal monitor unit 300 and the adaptive power-regulating unit 200 work together to maintain peak performance while combating overheating.

In a further embodiment, the thermal monitor unit 300 interfaces with an adaptive clock control unit 220. The thermal monitor unit 300 transmits one or more clock control signals to the clock control unit 220. In response, the clock control unit 220 alters the clock signals sent to one or more circuits within, adjacent to, or thermally coupled to thermal region 304. For example, the thermal monitor unit 300 may respond to excessive conditions in thermal region 304a by sending a clock control signal to the adaptive clock control unit 220 to reduce the frequency of the clock signal for circuit 102a in thermal region 304a . If thermal region 304b is not experiencing adverse conditions, the thermal monitor unit 300 may send a clock control signal to the adaptive clock control unit 220 to maintain or increase the current frequency in circuit 102b. By independently monitoring and responding to thermal events for thermal regions 304a and 304b. circuit devices in each thermal region can operate at their maximum levels of performance.

The thermal monitor unit 300 may also interface with the dispatch unit 240 to direct traffic away from or towards a circuit device. In an embodiment, the thermal monitor unit 300 assigns and transmits a thermal factor for each circuit device 102a and 102b to the dispatch unit 240. The dispatch unit 240 weighs the thermal factor when assigning instructions to the circuit devices. Small thermal factor values for circuit device 102a may drive a percentage of traffic away from circuit device 102a and towards device 102b . Moderate thermal factor values may drive all traffic towards device 102b . Critical thermal factor values may suspend all tasks for circuit device 102a and reassign them to circuit device 102b.

The thermal monitor unit 300 may also issue power-saving commands directly to circuit devices 102. In some embodiments, the thermal monitor unit 300 responds to an event by issuing a Shutdown command to a circuit device 102. This action may greatly reduce heat output in the associated thermal region 304. However, as a Shutdown command may compromise data, other low power mode commands such as Halt and Sleep (as per the Advanced Configuration and Power Interface standard) are supported as well. In a Halt state or C1 state, no commands are executed, but the circuit device 102 remains powered. In a Sleep state or C3 state, volatile caches are flushed, and parts of the circuit device 102 may be powered down. Power-saving commands may not be recognized by all circuit devices 102 within the thermal region. In fact, in embodiments where more than one circuit device 102 within a thermal region 304 may be powered down, the thermal monitor unit 300 may power down any one or more of the circuit devices 102 while leaving the remainder functioning. When a command to power down a circuit device 102 may result in a loss of data, the thermal monitor unit 300 may issue a request to a dispatch unit 240 to reassign the instruction transparently to an alternate circuit device 102.

As described above, correlating the location and operating characteristics of the circuits with the thermal regions and the thermal map allows a transformation between circuits, circuit regions, and thermal regions, which provides fine-grained control while maintaining the highest level of performance possible.

Particularly in, but not limited to, embodiments where the thermal monitor unit 300 adjusts operating parameters such as operating voltage or clock signal frequency, the thermal monitor unit 300 further observes individual circuit devices 102 to ensure that changes do not cause the device to fail. This may be done by monitoring a "heartbeat" signal. For example, a heartbeat signal can be generated by an instruction executed by a circuit device 102 to pulse a heartbeat output of the circuit device 102 at a regular interval. In the event of a fault such as a deadlock, livelock, or inadvertent reset, the heartbeat output would fail to pulse as expected. In some embodiments, the thermal monitor 300 includes a heartbeat monitor. If the heartbeat monitor does not receive a regular heartbeat signal from a circuit device 102, the thermal monitor 300 responds by reverting changed parameters such as operational voltage or clock signal frequency or responds by rebooting the circuit device 102. The thermal monitor 300 may also hold the device in a Halt, Sleep, or Shutdown condition until further user input is received. This is useful if a circuit device 102 repeatedly fails to work at a lower voltage or frequency.

In further embodiments, the thermal monitor unit 300 utilizes the heartbeat signal to pursue aggressive reductions in power. Instead of making large changes in operating parameters, the thermal monitor 300 instructs the adaptive power-regulating unit 200 or adaptive clock control unit 220 to make a smaller change. The thermal monitor unit 300 pauses to determine whether the circuit devices 102 within the thermal region 304 operate correctly at the new parameters. If the circuit devices 102 function correctly and the thermal condition does not abate, the thermal monitor unit 300 may make another small change to the operating parameters. This is continued until a minimum operating power is reached or until the thermal condition is resolved.

It is not necessary or always optimal for the thermal monitor unit 300 to take corrective action exclusively in the thermal region that is experiencing the thermal event. By utilizing the thermal map, the thermal monitor unit 300 can recognize contributing factors that may be remedied in order to alleviate the thermal condition. For example, airflow issues may cause heat from circuit device 102*b* to collect in region 304*a* but not in region 304*b* where circuit device 102*b* is located. Modifying operating parameters of circuit device 102*a* within region 304*a* may not relieve this condition as effectively as modifying operating parameters of circuit device 102*b* . From the thermal map, the thermal monitor unit 300 recognizes the contributing factors to the thermal conditions of region 304*a* . In response, the thermal monitor unit 300 modifies the operation of region 304*b* to relieve the condition of region 304*a*.

The thermal monitor unit 300 may also modify the operation of peripherals not located on the device board 100. In an embodiment, the thermal monitor unit 300 utilizes the bus interface unit 104 to send commands to connected devices. The thermal monitor unit 300 is capable of modifying operating parameters, such as voltage, clock frequency, and workload, of circuit devices on other device boards. The thermal monitor unit 300 can adjust airflow, coolant flow, and other regulating mechanisms on the device board 100 and elsewhere.

The thermal monitor unit 300 may further include a user interface. The user interface is used to notify the host system of thermal events and may allow users to change system parameters and reconfigure the thermal monitor unit 300. In some embodiments, the thermal monitor unit 300 sends a status notification to the user via the user interface. This status notification may include a list of current operating parameters, a list of recent events, a list of trigger criteria, status for various thermal regions 304, and other suitable status data. The status notification may be sent as a regularly occurring event, as a response to other data such as a critical temperature reading, as a response to a user request, or as a response to any other event. In some embodiments, the thermal monitor unit 300 records and stores temperature data and changes to operating parameters. The thermal monitor unit 300 may also record and store a record of the state of the circuit devices 102 including details on the instructions being executed. This may be crucial when debugging software that leads to an adverse thermal condition. In some embodiments, the user can also manually modify operating parameters, configure triggers and responses, and execute instructions such as to Resume or Shutdown circuit devices 102 via the user interface.

The user interface is intended to help users analyze performance metrics, evaluate system reliability, and resolve heat management issues. To facilitate this, software may be used to present the information in a form that is easy for the user to digest. For example, software may receive thermal information at the thermal reference points via the user interface and produce a diagnostic display. In an exemplary diagnostic display, a graphical bitmap illustrating the device board 100 is generated. The user then selects datasets to be displayed as overlays on the board illustration, such as a gradient map, measured thermal conditions, circuit device status including uptime and load, and other diagnostic information. The datasets may contain information received from the thermal monitor unit 300, information received from circuit devices 102 of the device board 100, information received from a host system, and information received from other sources. It is understood that the datasets may further contain information interpolated from received information, particularly when producing overlays such as gradient maps. For further clarity, the graphical bitmap may include one or more diagnostic regions. These may be, but are not necessarily, coincident with the thermal regions for any particular operating parameter. Software may also be used to manage the thermal monitor unit 300 via the user interface. For example, in high-risk environments, a software program on a host system may regularly inspect the thermal monitor unit 300 and trigger a shutdown of a circuit device 102 if the thermal monitor unit 300 is unable to resolve a problem.

Figure 4:
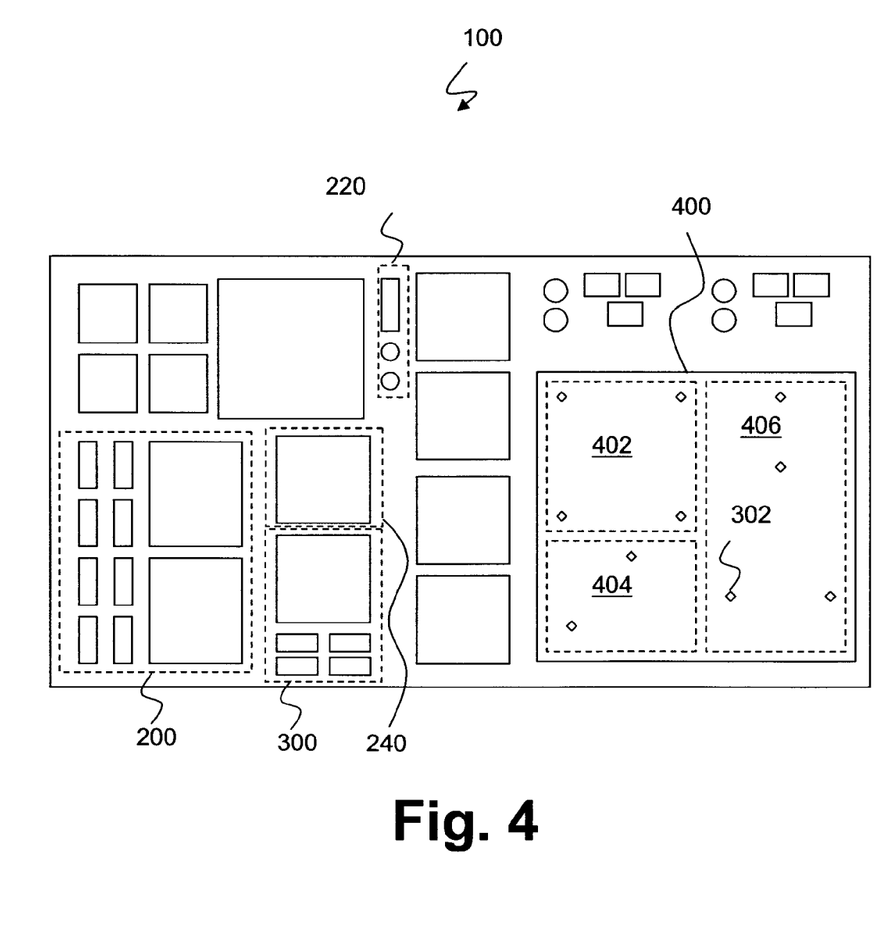
FIG. 4 is a diagrammatic top view of a device board according to various aspects of the present disclosure.

FIG. 4 is a diagrammatic top view of a device board 100 according to an embodiment of the present disclosure. In the depicted embodiment, circuit device 400 warrants multiple thermal regions 402, 404, and 406 and contains multiple temperature sensors 302 within the thermal regions. The thermal monitor unit 300 monitors the conditions of the temperature sensors 302 and of the thermal reference points. If necessary, the thermal monitor unit 300 is capable of altering the operating parameters of each thermal region of the circuit device 400 independently. This configuration allows finegrained control of heat generation. Regions of the circuit device 400 can be optimized in response to thermal conditions without affecting neighboring regions. In some embodiments, the thermal monitor unit 300 interfaces with an adaptive power-regulating unit 200 to alter the operating parameters of the circuit device 400. For example, the circuit device 400 may receive a different operating voltage for each of thermal regions 402, 404, and 406. In this way, the operating voltage for thermal region 402 can be altered without affecting the operating voltages of thermal regions 404 and 406. Likewise, in some embodiments, the thermal monitor unit 300 interfaces with an adaptive clock control unit 220 to alter the clock-related parameters of the circuit device 400. In further embodiments, the circuit device 400 is capable of altering its operating parameters independent of an adaptive power-regulating unit 200 or an adaptive clock control unit 220. This allows the thermal monitor unit 300 to coordinate with circuit device 400 directly to tune the operation of the circuit device 400. Furthermore, the thermal monitor unit 300 may interface with a dispatch unit 240 to assign workload to subunits of the circuit device 400. For example, workload may be shifted from subunits in thermal region 402 and towards subunits in thermal region 406. By modifying operating parameters of select thermal regions within a circuit device 400 while preserving the optimum performance of other thermal regions within the same device, the device board 100 retains performance that may otherwise be lost.

Figure 5:
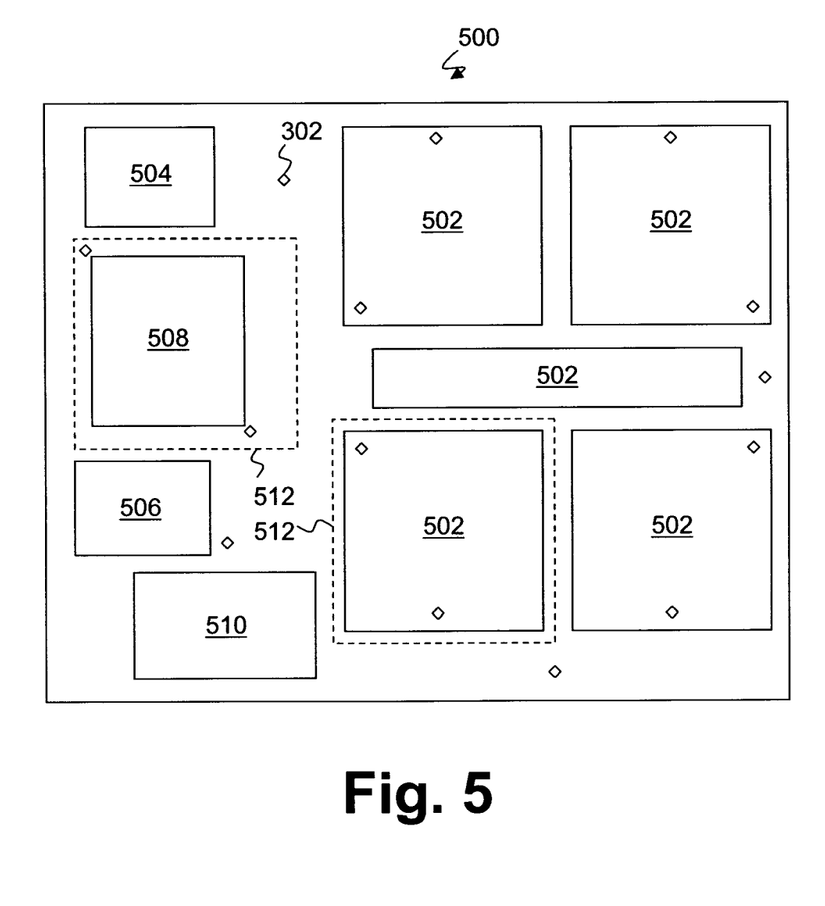
FIG. 5 is a schematic diagram of a circuit device according to various aspects of the present disclosure.

FIG. 5 is a schematic diagram of a circuit device according to an embodiment of the present disclosure. Circuit device 500 contains one or more circuit subunits 502, a chip-level power-regulating unit 504, a chip-level clock control unit 506, a chip-level dispatch unit 508, and a chip-level thermal monitor unit 510. Possible circuit subunits 502 include fixedpoint processing cores, floating-point processing cores, matrix math units, vector processing units, special function processors, controllers, branch prediction units, I/O interface units, intra-core interface units, wire busses, pervasive and test units, memory management units, and other suitable circuit subunits. In some embodiments, select circuit subunits 502 are memory such as caches, register files, memory arrays, programmable read-only memory, and flash memory.

The chip-level power-regulating unit 504 handles power distribution for the circuit device 500. The chip-level powerregulating unit 504 receives a source voltage for the circuit device 500, converts it to one or more operating voltages, and distributes the one or more operating voltages to the circuit subunits 502, the chip-level clock control unit 506, and the chip-level thermal monitor unit 510. In some embodiments, the chip-level power-regulating unit 504 is capable of varying the one or more operating voltages in response to a voltage control signal.

The chip-level clock control unit 506 creates the appropriate clocks for the functional logic within the circuit device 500. The chip-level clock control unit 506 receives a system clock for the circuit device 500, creates one or more functional clocks, and distributes the one or more functional clocks to the functional logic including that found in the circuit subunits 502 and the chip-level thermal monitor unit 510. In some embodiments, the chip-level clock control unit is capable of varying the one or more functional clocks in response to a clock control signal.

The chip-level dispatch unit 508 receives instructions and assigns them to subunits 502 for execution. The assignment may depend on the type of instruction, the capabilities of a particular subunit 502, the data dependencies of the instruction, the system resources available to the subunit 502, the current workloads of the subunit 502 and of other subunits, operating conditions of the subunit 502, and other factors. In some embodiments, the assignment further depends on a thermal factor assigned to a subunit 502. The thermal factor may cause the chip-level dispatch unit 508 to assign a given subunit 502 fewer instructions or no instructions or may cause the chip-level dispatch unit 508 to suspend all tasks assigned to the given subunit 502 and reassign them to other subunits.

The chip-level thermal monitor unit 510 observes and maintains a suitable thermal environment on the circuit device 500. The chip level thermal monitor unit 510 receives data from temperature sensors 302 and utilizes the data to determine conditions at thermal reference points. The thermal reference points are grouped by thermal region 512. A thermal region 512 may include part of a circuit subunit 502, an entire circuit subunit 502, more than one circuit subunit 502, or any combination thereof. In some embodiments, thermal regions 512 are defined differently for each operating parameter. It is not necessary for the entire circuit device 500 to have a corresponding thermal region 512. Particularly, areas of low density may not have an associated thermal region 512.

The chip-level thermal monitor unit 510 optimizes performance by monitoring conditions throughout the thermal regions 512 and taking corrective action such as varying operating parameters and issuing power-saving commands. In an embodiment, conditions at a thermal reference point can trigger a response. Possible triggering events include temperature data exceeding a preset limit, multiple thermal reference points with temperature exceeding a preset limit, excessive rate of change in temperature, and excessive temperature over a prolonged period. When thermal reference points do not correspond with the location of a temperature sensor 302, thermal conditions are interpolated. Interpolation may be based on a simple linear model, or may account for the existence, operation, and location of heat generating structures within the circuit device 500. Interpolation may also be based on systemic conditions that affect the device board 100.

When the chip-level thermal monitor unit 510 detects unacceptable conditions in a thermal region 512, it may take one or more corrective actions in response. The thermal monitor unit 510 may issue a command to shut down integrated circuits within thermal region 512 or may issue a command to place the integrated circuits into a low-power mode. The chip-level thermal monitor unit 510 may also modify an operating parameter, such as voltage, frequency, or workload, for the region. In an embodiment, the chip-level thermal monitor unit 510 interacts with the chip-level power-regulating unit 504 to reduce the operating voltage delivered to a thermal region 512. In a further embodiment, the chip-level thermal monitor unit 510 interacts with the chip-level clock control unit 506 to reduce the frequency of the functional clock for a thermal region 512. In an embodiment, the chip-level thermal monitor unit 510 interacts with the chip-level dispatch unit 508 to reduce the workload for a thermal region 512. In some embodiments, after modifying an operating parameter, the chip-level thermal monitor unit 510 observes the circuits within the thermal region to ensure that the circuits function properly at the new operating parameter. In such embodiments, the chip-level thermal monitor unit 510 may include a heartbeat monitor to track the operating status of the circuit subunits.

Figure 6:
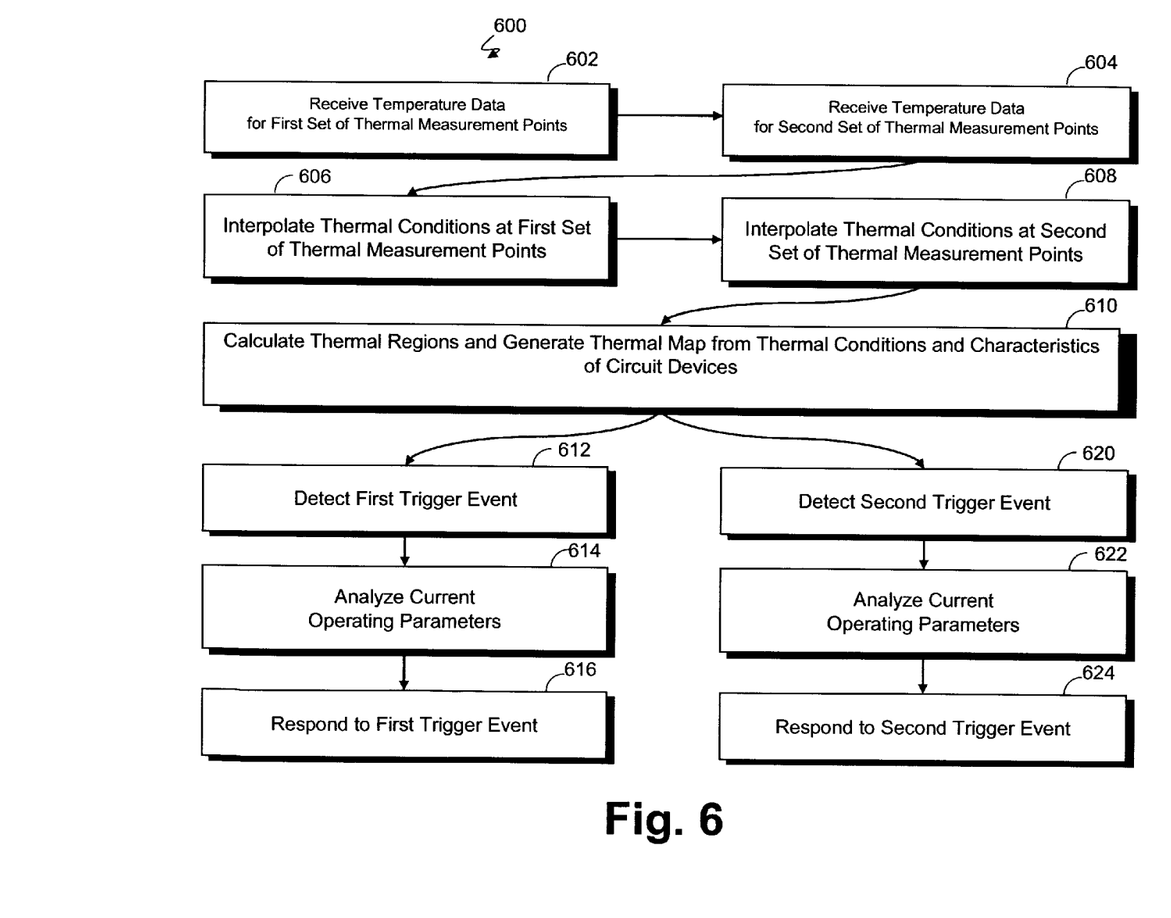
FIG. 6 is a flow chart of a method of thermal management for a device board according to an embodiment of the present disclosure.

FIG. 6 is a flow chart of an exemplary method of thermal management for a device board. Additional steps can be provided before, during, and after the method 600, and some of the steps described can be replaced or eliminated for other embodiments of the method. The method 600 begins at block 602 where temperature data is received for a first set of thermal measurement points. At block 604, temperature data is received for a second set of thermal measurement points. At blocks 606 and 608, thermal conditions are interpolated for the first and second set of thermal reference points, respectively, where directly measured data is not available. At block 610, a thermal map is determined from the thermal conditions at the first and second sets of thermal reference points, interpolated data, stored location and correlation information, and from the thermal characteristics of circuit devices that affect the first and second thermal regions. At block 612, a first trigger event is detected. This trigger event may be based on received temperature data, interpolated temperature data, rates of change of temperature data, and/or other trigger criteria. At block 614, the current operating parameters are analyzed for circuit devices within the first thermal region. At block 616, a first response is made to the trigger event. Exemplary responses include modifying an operating parameter within the thermal region and issuing a command to suspend or shut down a circuit device within the thermal region. At block 620, a second trigger event is detected. At block 622, the current operating parameters are analyzed for circuit devices within the second thermal region. At block 624, a second response is made to the trigger event.

Figure 7:
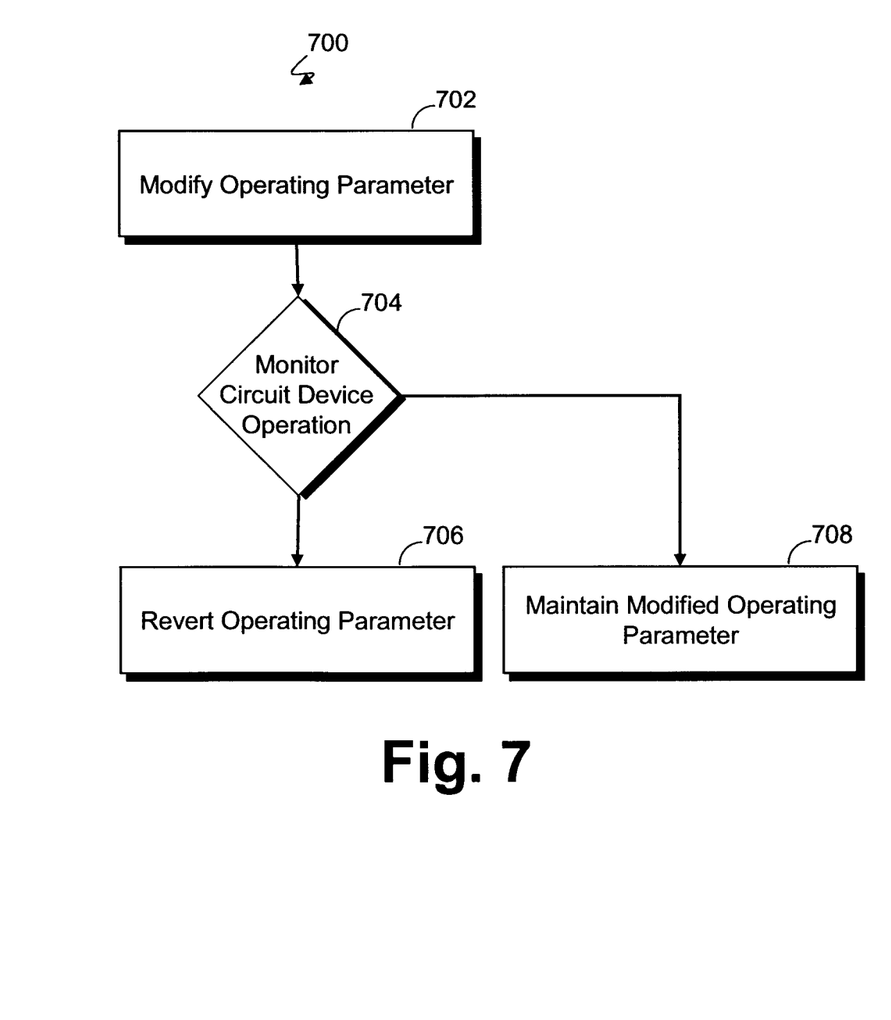
FIG. 7 is a flow chart of a method of thermal management for a device board according to an embodiment of the present disclosure.

FIG. 7 is a flow chart of an exemplary method of thermal management for a device board. The method 700 begins at block 702 where an operating parameter is modified. At block 704, a circuit device affected by the modification to the operating parameter is monitored to determine whether the circuit device functions properly. If not, at block 706, the operating parameter is reverted to a previous value. If the circuit device functions properly with the modified operating parameter, at block 708, the operating parameter is maintained at the modified value.

Figure 8:
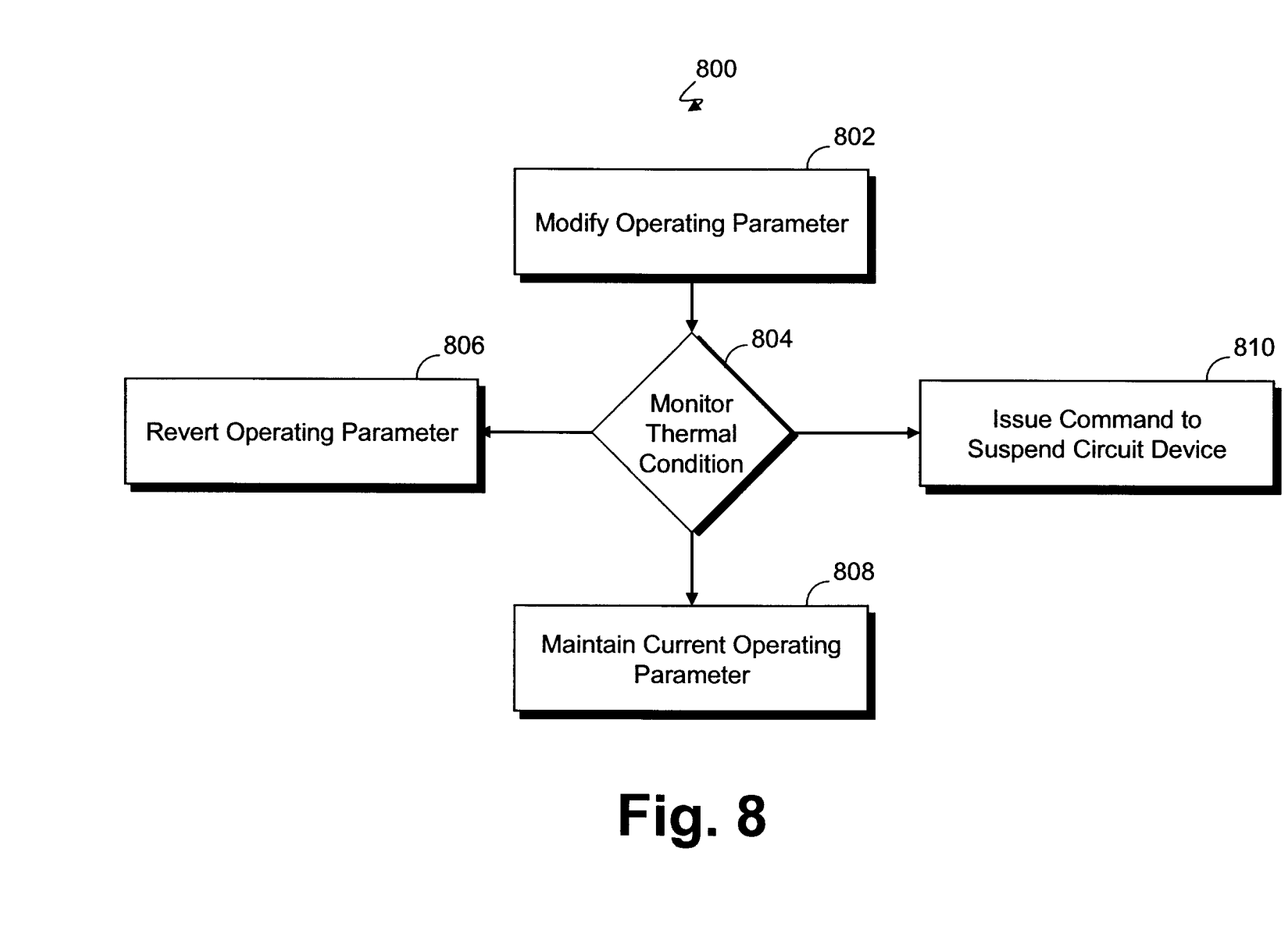
FIG. 8 is a flow chart of a method of thermal management for a device board according to an embodiment of the present disclosure.

FIG. 8 is a flow chart of an exemplary method of thermal management for a device board. The method 800 begins at block 802 where an operating parameter is modified. At block 804, the temperature data is monitored to determine whether the modified operating parameter was successful at resolving the temperature event. If the temperature data indicates that the temperature is no longer critical, at block 806, the operating parameter is reverted to a previous value. If the temperature remains within a critical window, at block 808, the operating parameter is maintained in its current state. If the temperature exceeds the critical window, at block 810, a command is issued to instruct a circuit device within the thermal region to suspend operation.

Figure 9:
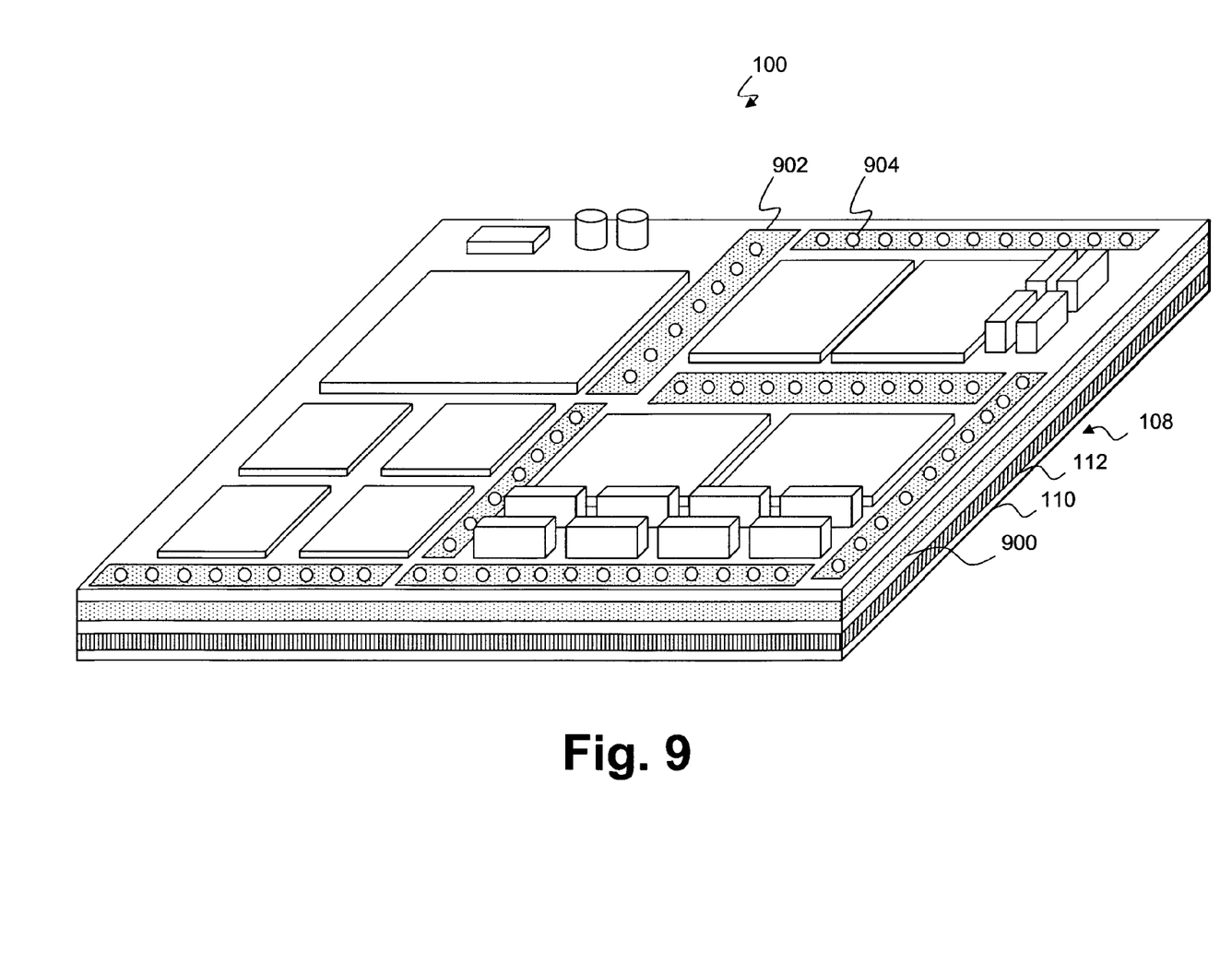
FIG. 9 is a diagrammatic perspective view of a device board according to various aspects of the present disclosure.

FIG. 9 is a diagrammatic perspective view of a device board according to various aspects of the present disclosure. FIG. 9 and all other figures herein are simplified for clarity. In a further embodiment of the system and method for thermal management of a device board, the PCB 108 of the device board 100 may include a thermal dissipating layer 900 between the insulating layers 110. The thermal dissipating layer 900 is used to conduct heat away from active regions of the device board 100 and towards one or more radiating islands 902 disposed on the surface of the PCB 108. Areas of the thermal dissipating layer, such as those in proximity to circuit devices, absorb heat. The heat is conducted along the thermal dissipating layer 900 to the thermal vias 904. The thermal vias 904 transfer heat energy through the insulating layers 110 of the PCB 108 and to the radiating islands 902. In many applications, space around the device board 100 is limited. It may not be possible to add heat sinks directly above heat-generating components. By conducting heat through the PCB 108, this structure disperses heat without adding excessive height to the device board 100.

The radiating islands 902 may comprise any suitable radiating material such as copper, tin, silver, aluminum, gold, non-metallic conductors, organic conductors, and/or other suitable heat-transferring materials. In some embodiments, the radiating islands 902 are configured to conduct heat to the perimeter of the device board 100. In further embodiments, the radiating islands 902 conduct heat to a heat transfer system in the host system such as an airflow region, a heat pipe, or a liquid cooling waterblock. In some embodiments, the radiating islands 902 may be disposed on the opposite side of the PCB from the circuit devices.

Figure 10:
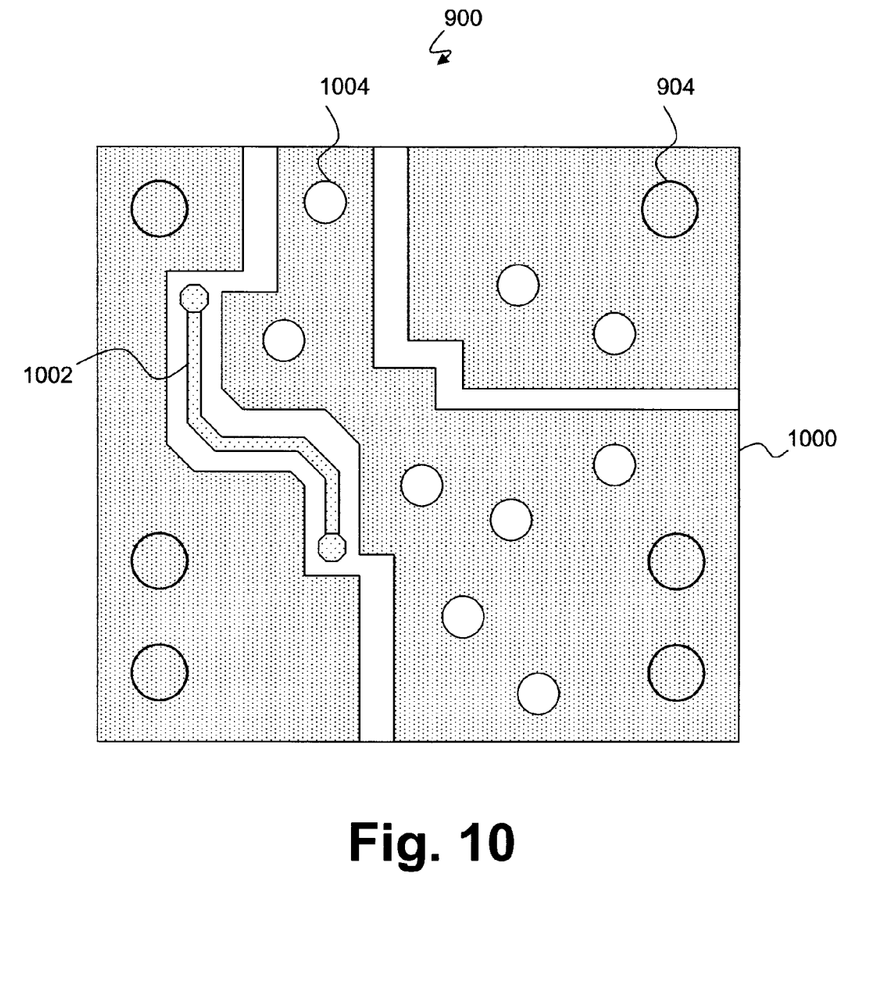
FIG. 10 is a diagrammatic top view of a thermal dissipating layer according to various aspects of the present disclosure.

FIG. 10 is a diagrammatic top view of a thermal dissipating layer according to various aspects of the present disclosure. The thermal dissipating layer 900 includes thermally conductive regions 1000 of a thermally conductive material such as copper, aluminum, tin, silver, gold, non-metallic conductors, and organic conductors. In addition to thermally conductive regions 1000, the thermal dissipating layer 900 may include one or more electrically conductive circuit traces 1002 for routing signals between circuit devices. In embodiments where the thermally conductive regions 1000 are electrically conductive as well, the regions 1000 may include holes 1004 to allow signal vias from trace layers 112 to pass through the thermal dissipating layer 900 without shorting. In some embodiments suitable for device boards 100 that generate substantial heat, multiple thermal dissipating layers 900 are used. The additional thermal dissipating layers 900 are connected with thermal vias 904. This configuration enhances the thermal conductive capacity of the overall structure.

Although the various embodiments are described herein with reference to thermal measurement and thermal stress, it is explicitly contemplated that the technique of: 1) developing a multi-dimensional map representing a type of stress experienced by a system; and 2) utilizing the multi-dimensional map to adaptively respond can be applied to other types of stress. In particular, the same technique may be applied to vibration sensors and vibration stress, bandwidth utilization and communication pressure, circuit monitoring and circuit faults. In each of the embodiments described above, it is possible to substitute the thermal reference point and thermal measurement with a stress reference point and stress measurement and to use the corresponding system stress map to respond.

The present embodiments can take the form of an entirely hardware embodiment, an entirely software embodiment, or an embodiment containing both hardware and software elements. Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, a semiconductor system (or apparatus or device), or a propagation medium.

Thus, the present invention provides a system and method for thermal management for integrated circuits. In one embodiment, the circuit device board includes: a plurality of circuits; a plurality of temperature sensors; a thermal management unit; and a printed circuit board wherein the plurality of temperature sensors are communicatively coupled to the thermal management unit and at least one of the plurality of circuits are controllably coupled to the thermal management unit; and wherein the thermal management unit comprises a thermal monitor unit configured to receive thermal data from the plurality of temperature sensors and to determine a plurality of thermal reference points, the thermal reference points defining a plurality of thermal regions; wherein the thermal monitor unit is further configured to make a first corrective response to modify the conditions in a first thermal region; wherein the thermal monitor unit is further configured to make a second corrective response to modify the conditions in a second thermal region; and wherein the first corrective response and the second corrective response are independent.

In a further embodiment, the circuit device includes: a power-regulating unit; a clock control unit; a plurality of circuit subunits; a plurality of temperature sensors; and a thermal management unit configured to receive thermal data from the plurality of temperature sensors and to determine a plurality of thermal reference points, the thermal reference points defining a plurality of thermal regions; wherein the thermal management unit is further configured to make a first corrective response to modify the conditions in a first thermal region; wherein the thermal management unit is further configured to make a second corrective response to modify the conditions in a second thermal region; and wherein the first corrective response and the second corrective response are independent.

In yet another embodiment, the method of thermal management includes: measuring thermal data at a plurality of points in a circuit device; determining a thermal map from the thermal data, the thermal map comprising a plurality of regions, and wherein the values in the thermal map are correlated with the operating characteristics of the circuit device; identifying a first trigger event for a first thermal region; analyzing current operating parameters of the first thermal region; responding to the first trigger event by making a first corrective response; identifying a second trigger event for a second thermal region; and analyzing current operating parameters of the second thermal region; responding to the second trigger event by making a second corrective response; wherein the first corrective response and the second corrective response are independent.

This disclosure presents several embodiments so that those skilled in the art may better understand the features and advantages of the present disclosure. Those skilled in the art will appreciate that the disclosure serves as a basis for designing or modifying other processes and structures for carrying out the same purposes and/or achieving the same advantages of the embodiments introduced herein. Those skilled in the art will also appreciate that such equivalent constructions do not depart from the spirit and scope of the present disclosure, and that the various changes, substitutions, and alterations remain within the spirit and scope of the present disclosure.

What is claimed is:

1. A circuit device board comprising:
a plurality of circuits;
a plurality of temperature sensors;
a thermal management unit; and
a printed circuit board wherein the plurality of temperature sensors are communicatively coupled to the thermal management unit and at least one of the plurality of circuits is controllably coupled to the thermal management unit; and
wherein the thermal management unit comprises a thermal monitor unit configured to receive thermal data from the plurality of temperature sensors and to determine a thermal condition at a plurality of thermal reference points based on the received thermal data, the thermal reference points defining a plurality of thermal regions;
wherein at least one of the plurality of thermal reference points is spaced away from each of the plurality of temperature sensors;
wherein the thermal monitor unit is further configured to make a first corrective response to modify a first condition in a first thermal region;
wherein the thermal monitor unit is further configured to make a second corrective response to modify a second condition in a second thermal region; and
wherein the first corrective response and the second corrective response are independent.

2. The circuit device board of claim 1,
wherein the thermal management unit further comprises a power-regulating unit; and
wherein one of the first and second corrective responses is a modification to the operating voltage of a controllably coupled circuit.

3. The circuit device board of claim 1,
wherein the thermal management unit further comprises a clock control unit; and
wherein one of the first and second corrective responses is a modification to the clock signal of a controllably coupled circuit.

4. The circuit device board of claim 1,
wherein the thermal management unit further comprises a dispatch unit; and
wherein one of the first and second corrective responses is a modification to the workload of a controllably coupled circuit.

5. The circuit device board of claim 1, wherein the first corrective response modifies an operating parameter of a circuit in a third thermal region.

6. The circuit device board of claim 5, wherein the modified operating parameter is one of a voltage parameter, a clock parameter, and a workload parameter.

7. The circuit device board of claim 1, further comprising a bus interface unit communicatively coupled to the thermal management unit.

8. The circuit device board of claim 7, wherein the bus interface unit is configured to communicate one of thermal region information, interpolated thermal region information, and corrective responses.

9. The circuit device board of claim 1, wherein one of the first and second corrective responses is one of a reset and a power-saving command.

10. A circuit device board comprising:
a plurality of circuits;
a plurality of temperature sensors;
a thermal management unit; and
a printed circuit board wherein the plurality of temperature sensors are communicatively coupled to the thermal management unit and at least one of the plurality of circuits is controllably coupled to the thermal management unit; and
wherein the thermal management unit comprises a thermal monitor unit configured to receive thermal data from the plurality of temperature sensors and to determine a plurality of thermal reference points, the thermal reference points defining a plurality of thermal regions;
wherein the thermal monitor unit is further configured to make a first corrective response to modify a first condition in a first thermal region;
wherein the thermal monitor unit is further configured to make a second corrective response to modify a second condition in a second thermal region;
wherein the first corrective response and the second corrective response are independent; and
wherein the thermal monitor unit is further configured to interpolate one or more thermal reference points as part of determining the plurality of thermal reference points.

11. The circuit device board of claim 10, wherein the thermal monitor unit is configured to interpolate the one or more thermal reference points based on a location of the respective interpolated thermal reference point and a location of at least one of the plurality of temperature sensors.

12. A circuit device comprising:
a power-regulating unit;
a clock control unit;
a plurality of circuit subunits;
a plurality of temperature sensors; and
a thermal management unit configured to receive thermal data from the plurality of temperature sensors and to determine a plurality of thermal reference points, the thermal reference points defining a plurality of thermal regions;
wherein at least one of the plurality of thermal reference points is an interpolated point that is spaced away from each sensor of the plurality of temperature sensors;
wherein the thermal management unit is further configured to make a first corrective response to modify a first condition in a first thermal region;
wherein the thermal management unit is further configured to make a second corrective response to modify a second condition in a second thermal region; and
wherein the first corrective response and the second corrective response are independent.

13. The circuit device of claim 12, wherein one of the first and second corrective responses modifies the operation of the power-regulating unit.

14. The circuit device of claim 12, wherein one of the first and second corrective responses modifies the operation of the clock control unit.

15. The circuit device of claim 12, further comprising a dispatch unit; and
wherein one of the first and second corrective responses modifies the allocation of work by the dispatch unit.

16. The circuit device of claim 12, wherein the circuit device is one of a single-chip module and a multi-chip module.

17. The circuit device of claim 12, wherein the thermal management unit is further configured determine a thermal condition at the interpolated point based on a distance between a heat-generating element and the interpolated point.

18. A method of thermal management comprising:
measuring thermal data at a plurality of points in a circuit device;
interpolating a thermal condition at a location disposed away from a temperature sensor of the circuit device;
determining a thermal map from the thermal data and from the interpolated thermal condition, the thermal map comprising a plurality of regions, and wherein values in the thermal map are correlated with the operating characteristics of the circuit device;
identifying a first trigger event for a first thermal region;
analyzing current operating parameters of the first thermal region;
responding to the first trigger event by making a first corrective response;
identifying a second trigger event for a second thermal region;
analyzing current operating parameters of the second thermal region; and
responding to the second trigger event by making a second corrective response;
wherein the first corrective response and the second corrective response are independent.

19. The method of claim 18 wherein the first corrective response modifies the operating characteristics within a thermal region of the circuit device.

20. The method of claim 18 wherein the regions of the thermal map are defined by one of correlated control structures, thermal values, or thermal variation.

21. The method of claim 18,
wherein the thermal data is received from a plurality of temperature sensors, and
wherein the interpolating of the thermal condition includes:
identifying a heat-generating element disposed among the plurality of temperature sensors; and
interpolating the thermal condition based on a distance between the identified heat-generating element and at least one of the plurality of temperature sensors.

* * * * *